Sept. 2, 1958  A. H. NELLEN  2,850,066
VEHICLE TIRE CONSTRUCTION
Filed June 18, 1954  3 Sheets-Sheet 1
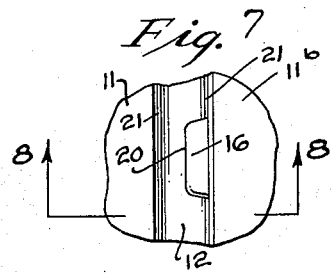
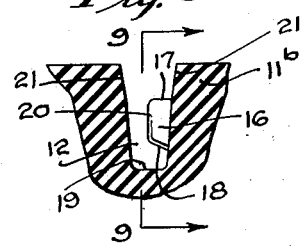
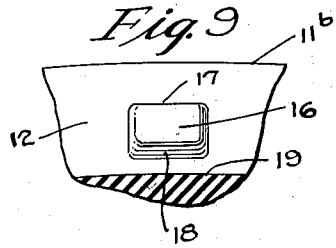
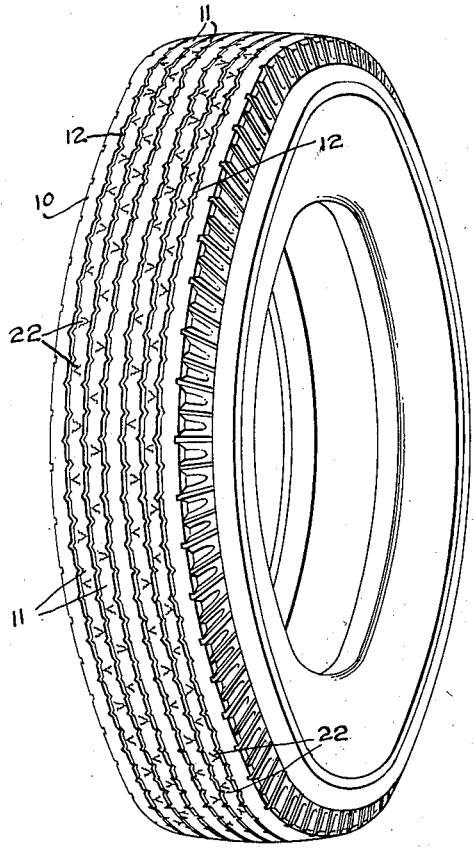
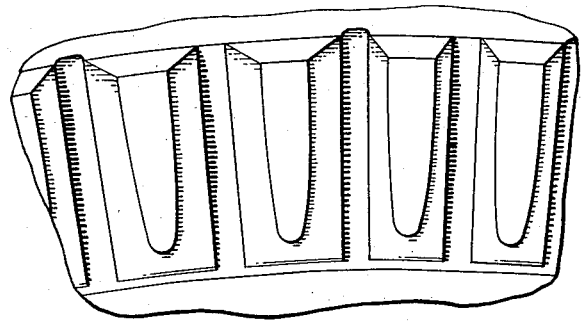
INVENTOR.
ARTHUR H. NELLEN
BY
ATTORNEY.

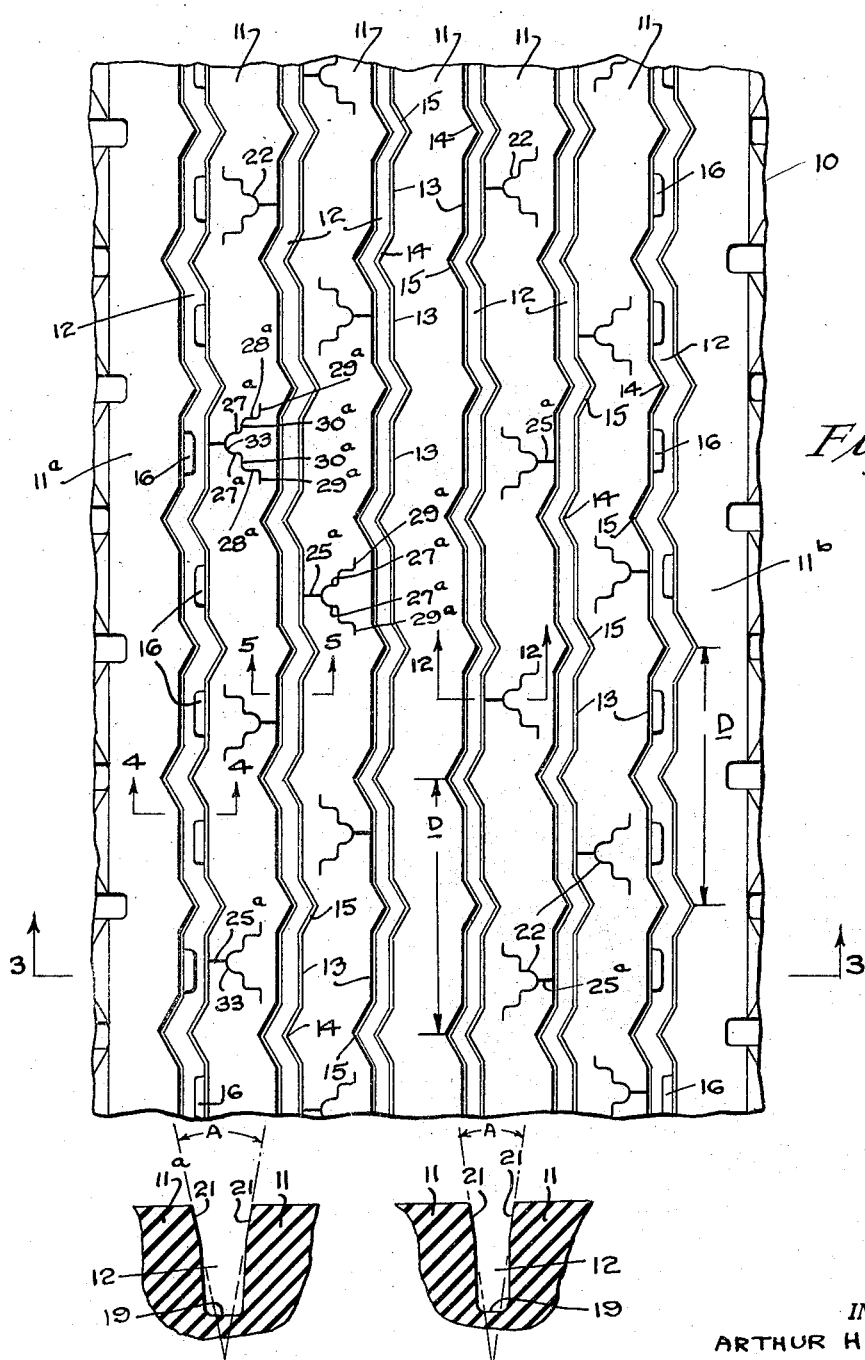

Sept. 2, 1958     A. H. NELLEN     2,850,066
VEHICLE TIRE CONSTRUCTION
Filed June 18, 1954     3 Sheets-Sheet 3
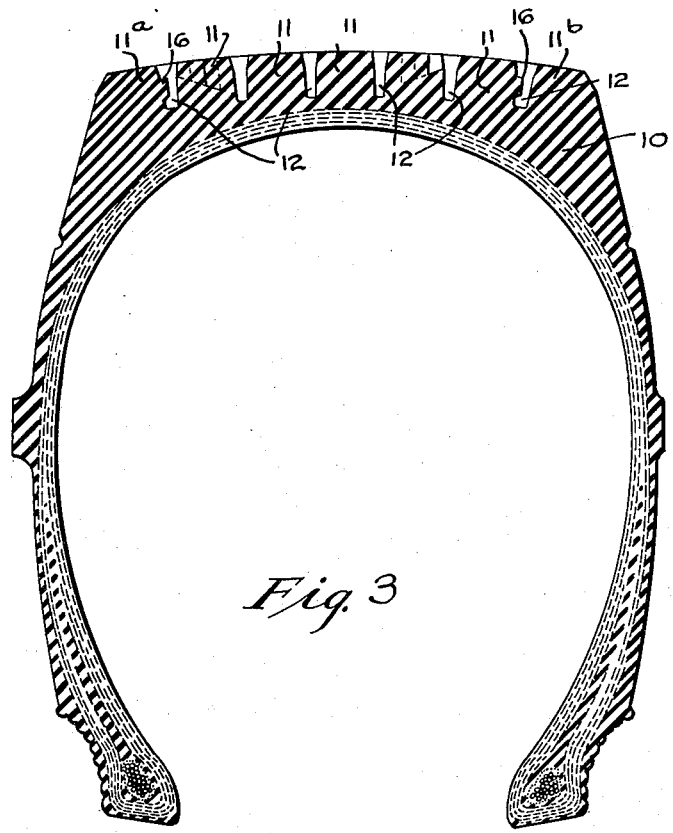
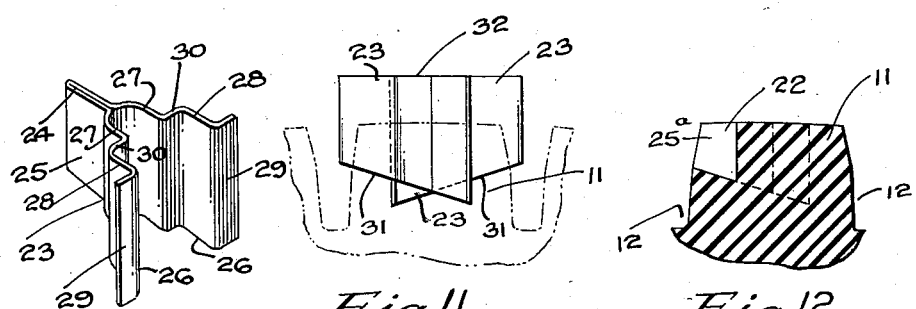
INVENTOR.
ARTHUR H. NELLEN
BY
*Leo Edelson*
ATTORNEY.

United States Patent Office 2,850,066
Patented Sept. 2, 1958

2,850,066

VEHICLE TIRE CONSTRUCTION

Arthur H. Nellen, King of Prussia, Pa., assignor to Lee Rubber & Tire Corporation, Conshohocken, Pa., a corporation of Pennsylvania Application June 18, 1954, Serial No. 437,660

4 Claims. (Cl. 152—209)

This invention relates to vehicle tires and more particularly to the design and construction of the tread of a pneumatic tire casing having improved operating characteristics.

Among the important desiderata for most successful performance of vehicle tires, especially passenger car tires, are (1) adequate traction on both wet and dry pavements so as to permit rapid acceleration without slippage and sudden braking without skidding; (2) noiseless operation not only during normal straightaway running of the vehicle but also while it is cornering and when it is being braked; (3) reduction to the minimum of any tendency to pick up loose stones and gravel with resulting objectionable clicking noise; (4) long wearing life and freedom from flats; and (5) rugged, yet pleasantly streamlined appearance which blends with and conforms to the esthetic design of the modern car.

Having in mind the foregoing, it is among the principal objects of the present invention to provide a tire casing construction which is characterized by a tread formed of a plurality of circumferentially continuous road-engaging ribs which are separated from one another by grooves of substantial depth and of a shape and configuration especially designed upon operation of the tire to prevent loose stones and gravel from becoming lodged therein.

A further and important object of this invention is to incorporate in at least the two outermost grooves of the tire tread so-called "buffers" which are circumferentially spaced about said grooves and serve to prevent closing of these grooves by excessive deflection of the ribs, particularly the outer edge ribs of the tire, when the vehicle is cornering, that is, rounding a turn. It is a well known fact that the annoying and objectionable squealing which generally occurs upon making turns at comparatively high speed is due primarily to uncontrolled lateral flexing or vibration of the outermost edge ribs of the tread. By disposing the aforesaid buffers within the outer grooves in spaced relation not only from the road-engaging surfaces of the adjacent treads but also from the bases of the grooves, they limit and control the extent to which the edge treads may flex during cornering of the vehicle, as well as the frequency of such flexing, in consequence of which squealing and other noises which commonly occur when making turns have been substantially, if not completely, eliminated. Inasmuch as the objectionable squeal is produced primarily by uncontrolled flexing and vibration of the outer ribs the buffers aforesaid are preferably disposed only in the two outermost grooves of the tire tread to thereby control the frequency of vibration of the outer ribs while leaving the inner ribs freely flexible, thereby assuring for the tire the desirable smooth and soft riding qualities and the necessary resiliency to absorb with a maximum of riding ease the normal shocks to which the tire may be subjected during its operation.

Still another and important object of the present invention is to provide some or all of the intermediate ribs of the tire tread with "sipes" or traction-slits of an entirely new and original configuration, these sipes being so spaced circumferentially about the ribs in which they are located and being so oriented in the ribs as to increase materially the holding power of the tire against both forward and sidewise skidding. While these sipes are described more specifically in the detailed specification which follows, it is to be noted that in accordance with the general objects of the present invention the sipes are all of the same general shape and design but of several different lengths measured circumferentially of the tire, these sipes of different lengths being so irregularly spaced along the ribs in which they are incorporated as to render dissonant their frequencies of vibration and so reduce to a minimum any noise which the sipes may tend to produce during operation of the tire.

Other objects and advantages will appear more fully hereinafter, it being understood that the present invention consists substantially in the combination, construction, location and relative arrangement of parts, all as described in the following detailed specification, as shown in the accompanying drawings and as finally pointed out in the appended claims.

In the accompanying drawings, which are illustrative of a preferred construction—

Figure 1 is a perspective view of a vehicle tire casing having a tread constructed in accordance with and embodying the principles of the present invention;

Figure 2 is a fragmentary plan view of the tread of the tire shown in Figure 1;

Figure 3 is a transverse sectional view of the tire casing as taken along the line 3—3 of Figure 2;

Figures 4 and 5 are fragmentary sectional views taken respectively along the lines 4—4 and 5—5 of Figure 2 drawn to a somewhat larger scale than that of Figure 3;

Figure 6 is a fragmentary elevational view of the side wall portion of the tire immediately contiguous with the tread portion theerof;

Figure 7 is a fragmentary plan view on a somewhat enlarged scale of a portion of the tread;

Figure 8 is a transverse sectional view as taken along the line 8—8 of Figure 7;

Figure 9 is a sectional view as taken along the line 9—9 of Figure 8;

Figure 10 is a perspective view of one of the elements of the tire mold for forming the sipes or traction-slits in certain of the intermediate ribs of the tire tread;

Figure 11 is a view showing the relative disposition of a pair of the elements shown in Figure 10 for forming a pair of successive sipes or traction-slits in a given rib of the tire tread, a fragment of which is shown in phantom; and Figure 12 is a transverse sectional view as taken along the line 12—12 of Figure 2.

Referring now to the drawings and more particularly to Figures 1, 2 and 3 thereof, it will be observed that the tire casing of the present invention is characterized by a tread portion 10 having a plurality of circumferentially continuous, generally parallel road-engaging ribs 11 which are separated from one another by intervening grooves 12. While the general design and pattern of the ribs 11 and their intervening grooves 12 in plan may vary as desired, the grooves are preferably of zig-zag or serpentine configuration to provide ribs of complemental zig-zag or serpentine configuration, it being noted that in the preferred construction as shown the opposite side edges of each circumferentially continuous rib 11 are respectively characterized by circumferentially spaced straight portions 13 which are joined together by alternately disposed complementally formed projections 14 and indentations 15 of generally V-shape in plan. It will be noted also that the straight portions 13 along one side edge of each intermediate rib 11 are disposed opposite the corresponding straight portions extending along the other side edge of the same rib and that the V-shaped projections 14 along one edge of the rib are disposed opposite the complementally shaped indentations 15 along the other edge of the rib.

In the tire construction illustrated, the tread portion 10 comprises five intermediate ribs 11 of the general character just described and two outer ribs 11ª and 11ᵇ, the inner edges of which are respectively separated from an adjacent intermediate rib by one of the aforementioned intervening grooves 12. The outermost edges of these two outer ribs 11ª and 11ᵇ may be of any desired configuration such as will merge them esthetically with the side wall of the tire casing, a portion of which is shown in Figure 6. Inasmuch as this side wall portion of the tire casing may be of any suitable design and forms no part of the present invention, a detailed description thereof is not believed to be necessary and so will be omitted.

In order to effect substantially noiseless operation of the tire tread, it is conventional practice in the art to vary the pitch lengths of those portions of the tread which are repeated in a particular rib of the tire, these repeated portions being known as "divisions." Each such division includes that portion of the tread which extends from the midpoint of one projection 14 of a rib to the corresponding midpoint of the next succeeding projection 14 thereof and consequently each such division embraces two of the straight line portions 13 and a pair of the oppositely presenting jogs formed as the result of the alternating projections and indentations along each side edge of a rib. One such division is designated D in Figure 2.

Also, in accordance with conventional practice, the tread portion of the tire is divided into a plurality of circumferential segments of equal degree, usually six of 60 degrees each, each of which segments includes a plurality of "divisions" of equal length or pitch. However, no two successive segments respectively contain the same number of divisions, it being the usual practice to employ divisions of three different pitch lengths, and to incorporate those of one length in one segment, those of the second length in the following segment, and those of the third length in the next following segment, this sequence being repeated throughout the full circumference of the tire. Thus, in the tire of the present invention, assuming it to be divided into six segments numbered 1 to 6 in sequence, segments 1 and 4 each may contain 8 divisions of one predetermined pitch length, segments 2 and 5 each may contain 7 divisions each of a pitch length greater than that of the divisions contained in segments 1 and 4, and segments 3 and 6 each may contain 9 divisions each of a pitch length less than that of the divisions contained in segments 1 and 4.

By so varying the number of design units or divisions for different segments of the tire tread and the sequential arrangement of the segments so that no two adjacent segments are of the same division pattern, the sounds created by the several segments of the ribs as they engage the road surface are not of the same frequency or duration but instead vary rapidly with the successive rise and fall of the frequencies of vibration induced by the different segment-division patterns of the tire tread, in consequence of which the overall noise of operation of the tire tread is materially and substantially reduced.

In order to prevent undue flexing of the outermost ribs 11ª and 11ᵇ of the tire tread and more or less complete intermittent closing of the grooves 12 immediately adjoining said ribs, as when the vehicle sways when rounding a curve, the inner walls of each of said ribs 11ª and 11ᵇ and proximate walls of their adjoining intermediate ribs 11 are respectively provided with integrally formed buffers 16 which serve as stabilizers to limit the permissible degree of inward flexing of the outer ribs 11ª and 11ᵇ. These buffers 16, which are of the form and configuration best shown in Figures 7, 8 and 9, are spaced circumferentially about the tire and project laterally into the outermost grooves 12—12 from the straight portions 13 of the ribs which form the opposite side walls of said grooves. It will be observed that these buffers 16 are of generally rectangular outline both in top plan and in longitudinal section and are all disposed with their top surfaces 17 spaced well below the road-engaging surfaces of the ribs of which they constitute integral elements and with their bottom ends 18 spaced well above the base 19 of the groove in which they are located. Generally speaking, the buffers 16 are of such depth and are so located in each of the outermost grooves 12—12 that they occupy approximately the middle third region of the groove considered depthwise thereof. It will be noted further that the width of each buffer 16 measured transversely of the groove in which it is located is approximately equal to one half the width of the groove in the region of the buffer so that the freely disposed inner face 20 of the buffer lies substantially in the median plane of the groove.

As has been indicated hereinbefore, it is preferred that the buffers 16 be confined exclusively to the outermost grooves 12—12 so as to stabilize the action of the outer ribs 11ª and 11ᵇ only of the tread. However, it may be desirable in certain instances to incorporate the buffers 16 in additional grooves of the tread portion of the tire and it will be understood that it is within the contemplation of the present invention to do so.

While any spacing and arrangement of the buffers 16 may be employed as desired, it is preferred that they be formed principally as elements protruding from the outer sides of the intermediate ribs 11—11 next adjoining the outermost ribs 11ª and 11ᵇ, although certain of them may project inwardly from the inner sides of the outermost ribs 11ª—11ᵇ. Thus, as most clearly appears in Figure 2, the buffers 16 projecting into the outermost grooves 12—12 may be arranged in series of three spaced along the innermost walls of said grooves in alternating relation to single buffers spaced along the outermost walls of said grooves. This 3–1 spacing of the buffers is especially desirable in the construction of the tire as shown, but may be varied as desired. Preferably, the size of the buffer varies in accordance with the length of the segment division D in which it is incorporated. Thus the divisions of greatest length (least number per segment) each include buffers of greatest length, those of intermediate length buffers of intermediate length and those of shortest length buffers of the shortest length. As most clearly appears in Figure 2, each division D includes two buffers, the spacing of the buffers being uniform throughout each segment of the tread.

It is important to observe that while the grooves 12 are all of equal substantial depth, their widths vary from a maximum dimension for the outermost grooves to a minimum dimension for the innermost central grooves. Thus, the outermost pair of grooves 11ª and 11ᵇ may be of a uniform width of 0.232 inch, the grooves respectively adjacent thereto may be 0.180 inch in uniform width, and the central pair of grooves may be only 0.162 inch in width. This graduation in groove width may be varied as desired to provide separated ribs of substantially equal width measured transversely across the road-engaging surfaces thereof, it being a characteristic feature of the tire of the present invention that all of its ribs are of substantially equal cross-sectional dimension in order that the load to which the tire is subjected may be equally distributed over all of the tread ribs. The outer portions of the several grooves 12 are each oppositely tapered, as at 21—21, outwardly toward the tread surface, as is most clearly shown in Figures 4 and 5, this tapering of each groove being confined to approximately the outer one-third portion thereof.

The slope of the outer tapered sides of the groove may, of course, be varied as desired, but experience has shown that a slope of from 8 to 10 degrees with reference to the median plane of the groove is adequate to prevent lodgement of stones in the groove and to insure that any stones entering the groove will be readily ejected by the camming action of the tapered sides of the groove upon the stones. As will appear from a study of Figures 4 and 5, the angle A included between the tapered sidewall portions 21—21 of the groove is such that the extended planes of the surfaces 21—21 intersect the median plane of the groove 12 at a point spaced radially inward from the base 19 of the groove. The outward tapering of the grooves, of course, results in complemental tapering of the intermediate riding ribs of the tire tread so that the opposite sides of each such rib are tapered inwardly toward the road-engaging surface thereof from a distance extending about one-third the depth of the rib. Such tapering of the riding ribs of the tire tread provides them with buttressed foundations which not only strengthens and reinforces the ribs themselves but also increases the lateral stability of the tire and so improves its safety factor.

A most important feature of the tire of the present invention is the specially designed traction-slit or "sipe" 22 of which a plurality are incorporated in circumferentially spaced relation in each of at least four of the intermediate riding ribs of the tire tread. Except for differences in overall length measured circumferentially about the tire, the sipes are all of the same general shape and configuration. These traction-slits or sipes 22 are essentially cuts formed in the tread ribs during the tire molding operation by the utilization of metal elements suitably fitted into the tread portion of the tire mold, the use of such sipe-forming elements being generally well known in the art of tire-building. The sipe-forming element 23 designed to produce the traction-slit or sipe of the present invention is shown in Figures 10 and 11, it being understood that the tire mold is internally fitted with as many of these elements in properly spaced relation as may be required for a given design of tire tread.

As most clearly appears in Figures 10 and 11, each sipe-forming element 23 of the present invention is in the form of a sheet metal stamping which is doubled upon itself, as at 24, to form a Y-shaped element having a flat stem part 25 and a pair of diverging branches 26—26, the stem part 25 being of a doubled thickness and the branches 26—26 being each of a single thickness of the metal of which the element is formed. Each of the diverging branches 26—26 is of the stepped configuration shown to provide the element with a pair of laterally spaced inner portions 27—27 and a pair of laterally spaced outer portions 28—28 respectively terminating in oppositely presenting coplanar flanged extremities 29—29. The outer portions 28—28, which are more widely spaced apart than are the portions 27—27, are respectively joined to the latter by intermediate oppositely turned coplanar portions 30—30. It will be noted that the coplanar extremities 29—29 and the intermediate coplanar portions 30—30 of the sipe-forming element 23 are respectively disposed in substantially parallel planes which are spaced from one another and extend generally normal to the planes of the stem part 25 and of the portions 27—27 and the portions 28—28. In other words, the stem part 25, the laterally spaced portions 27—27 and their laterally offset portions 28—28 all extend approximately at right angles to the remaining portions of the element 23 when the latter is viewed edgewise.

While the sipe-forming element 23 may be of uniform depth, its bottom edge 31 (see Figure 11) is preferably disposed in a plane which is inclined with respect to that of its upper edge 32, in consequence of which the Y-shaped traction-slit or sipe 22 formed by the element 23 in the outer surface of the tread riding rib 11 is of gradually increasing depth from one side of the rib to a point short of its opposite side (as see Figure 12), each sipe being thus of maximum depth at the points of its divergent extremities.

As most clearly appears in Figure 2, the Y-shaped sipes 22 are preferably formed in each of the two riding ribs 11—11 which next adjoin each of the outermost ribs 11ª—11ᵇ. Thus, in the tire construction shown, only four of the seven riding ribs are provided with sipes. It is to be understood, however, that the sipes may be incorporated in ribs other than those shown.

As has been indicated above, it is desirable that the circumferentially spaced sipes 22 formed in a particular rib be of different lengths measured circumferentially about said rib, the length of the sipe at a given point being determined by the length of the segmental division in which the sipe is included. Preferably, one sipe is provided for each segmental division D of the tire tread rib in which the sipes are included. Thus, in the segments containing the greatest number of divisions, the sipes, as are the divisions, are of shortest length and are more closely uniformly spaced than in the segments containing the smallest number of divisions wherein the sipes are of greatest length and are more widely uniformly spaced from one another. The sipes of intermediate length are similarly uniformly spaced throughout each of the segments containing the intermediate number of divisions. While the sipe-spacing in each segment of a rib 11 is uniform, the sipes in a given rib are circumferentially offset from those of an adjoining rib, as most clearly appears in Figure 2. This results in more or less indiscriminate spacing of the Y-shaped sipes 22 throughout all of the ribs in which they are incorporated, in consequence of which any tendency for the sipes to create a sound of constant pitch is eliminated. Accordingly, the sipes do not constitute factors which contribute to objectionable noises during running of the tire.

It will be noted that in the particular tread rib in which they are incorporated the several circumferentially spaced sipes 22 are successively reversely disposed so that alternate sipes have their stem parts 25ª presenting in opposite directions transversely of the rib, the end of each such stem part opening freely into the groove adjoining the rib. It will be noted further that the laterally spaced portions 27ª—27ª and 28ª—28ª of each sipe also extends transversely across the rib, in consequence of which these transversely extending portions of the traction-slits or sipes all serve effectively to provide increased holding power for forward running of the tire and to reduce forward slipping or skidding when the vehicle is braked.

The oppositely projecting portions 29ª—29ª and 30ª—30ª of the sipes which extend parallel to the median-plane of the rib in which the sipes are located, serve effectively to provide increased holding power against side slip and reduce materially any tendency for the vehicle to slip or skid sidewise when it is braked. The generally rounded part 33 of the sipe immediately adjoining the stem part 25ª thereof also contributes materially to provide increased road-holding power against forward or side skidding and for forward traction.

Tests made to determine the operating performance of tires constructed in accordance with the principles of the present invention have shown that they are remarkably free of objecionable noises and squeals not only during straight-away running but also while rounding curves, that they have a high degree of road stability with exceeding effective traction against both forward and lateral skidding and that they make steering of the vehicle equipped with such tire more positive and easier to control.

To demonstrate the improved operating efficiency and all-around performance of tires embodying the present invention, comparative tests were made between tires of the present invention and those of four different well-known tire manufacturers. All of the tires were subjected to identical tests under identical conditions and were operated for the same length of time during each test. In the tests conducted to determine the comparative overall noise level generated by the several test tires, representative samples of the overall sound for each different tire under test were taken by means of magnetic recordings using a pick-up position on the right front side of the vehicle as close as possible to the tire, the sound pick-up device being there mounted against shock and protected from ambient wind noise by a protective screen. The different test tires were each run for a total sound recording distance of 9000 feet plus or minus, and the recordings showed that the tires of the present invention had a much lower overall sound level than did the other tires under test.

In tests conducted to determine the relative "squeal" levels generated by the several test tires, each of the latter was tested under running conditions on a concrete surface turn of 200 feet radius, the speed of the tire-equipped vehicle being 30 and 40 M. P. H. for each test tire. Magnetic recordings of the "squeals" were taken for each test run over a period of 30 seconds and five second samples of such recordings were then played back to a jury of nine men who listened to the sounds first with one ear, then with the other ear and finally with both ears. Their unanimous finding was that of the tires tested the tire of the present invention had the least squeal.

The proper evaluation of lateral traction of a tire presents some difficulties because no specifications for a test of this nature has been devised by the tire industry to date. However, a fairly accurate comparison of lateral traction may be obtained by use of an Ampko Stuur-Control, made in Germany by Ampko-Stuur, which is a device which includes a stylus mounted in the vehicle some distance from the steering wheel, the stylus being directly connected to the steering wheel by means of a flexible arm having a non-flexible type of connecting cable. Oscillatory motion of the steering wheel is transmitted to the stylus through said flexible arm and is recorded upon a suitable chart by the stylus pen in degrees of steering wheel movement.

The vehicle equipped with the test tires was run over a 1.070 foot long test strip along a curved line of a given radius at a constantly maintained true speed of 35 M. P. H., and upon conclusion of the several test runs the recording charts showed that the vehicle equipped with the tires of the present invention had the best lateral traction.

It will be understood, of course, that the present invention is subject to various changes and modifications which may be made from time to time without departing from the general principles or real spirit of the invention, and it is accordingly intended to claim the same broadly, as well as specifically, as indicated by the appended claims.

What is claimed as new and useful is:

1. In a pneumatic tire casing of the character described, a tread portion comprising a plurality of laterally spaced circumferentially continuous riding ribs defining between each pair of adjoining ribs a groove of substantial depth, said ribs being each provided with circumferentially spaced portions of uniform width and substantial length longitudinally aligned circumferentially about said tire and respectively joined by laterally projecting offset portions which successively present in opposite directions to provide each side wall of each groove with circumferentially spaced complementally shaped indentations and projections arranged in alternating relation, the indentations in one side wall of a groove being disposed opposite the projection in the other side wall of said groove whereby the latter is of substantially uniform width throughout its circumferential extent, stabilizing means disposed in each of the two outermost grooves, said means comprising a plurality of circumferentially spaced buffer blocks which project inwardly toward the center of each of said outermost grooves from the side walls of selected rib portions aligned in the manner aforesaid, and a plurality of traction-slits in at least certain of the ribs intermediate said outermost grooves, each of said traction-slits having angularly related portions respectively extending at right angles and parallel to the median plane of the rib in which said slits are incorporated to provide the tire with increased traction against forward and side skidding.

2. In a pneumatic tire casing of the character described, a tread portion comprising a plurality of laterally spaced circumferentially continuous riding ribs defining between each pair of adjoining ribs a groove of substantial depth, said ribs being each provided with circumferentially spaced portions of uniform width and substantial length longitudinally aligned circumferentially about said tire and respectively joined by laterally projecting offset portions which successively present in opposite directions to provide each side wall of each groove with circumferentially spaced complementally shaped indentations and projections arranged in alternating relation, the indentations in one side wall of a groove being disposed opposite the projection in the other side wall of said groove whereby the latter is of substantially uniform width throughout its circumferential extent, stabilizing means disposed in each of the two outermost grooves, said means comprising a plurality of circumferentially spaced buffer blocks which project inwardly toward the center of each said outermost grooves from the side walls of selected rib portions aligned in the manner aforesaid, and a plurality of traction-slits in at least certain of the ribs intermediate said outermost grooves, each of said traction-slits having angularly related portions respectively extending at right angles and parallel to the median plane of the rib in which said slits are incorporated to provide the tire with increased traction against forward and side skidding, said traction-slits in the ribs immediately adjoining said outermost grooves being respectively located at points opposite every other one of said buffer blocks and being alternately disposed with portions thereof extending to the inner side walls of said outermost grooves.

3. In a pneumatic tire casing of the character described, a tread portion comprising a plurality of laterally spaced circumferentially continuous riding ribs defining between each pair of adjoining ribs a groove of substantial depth, said ribs being each provided with circumferentially spaced portions of uniform width and substantial length longitudinally aligned circumferentially about said tire and respectively joined by laterally projecting offset portions which successively present in opposite directions to provide each side wall of each groove with circumferentially spaced complementally shaped indentations and projections arranged in alternating relation, the indentations in one side wall of a groove being disposed opposite the projection in the other side wall of said groove whereby the latter is of substantially uniform width throughout its circumferential extent, stabilizing means disposed in each of the two outermost grooves, said means comprising a plurality of circumferentially spaced buffer blocks which project inwardly toward the center of each said outermost grooves from the side walls of selected rib portions aligned in the manner aforesaid, and a plurality of traction-slits in at least certain of the ribs intermediate said outermost grooves, each of said traction-slits having angularly related portions respectively extending at right angles and parallel to the median plane of the rib in which said slits are incorporated to provide the tire with increased traction against forward and side skidding, said traction-slits in the ribs immediately adjoining said outermost grooves being respectively located at points opposite every other one of said buffer blocks and being alternately disposed with portions thereof extending to the inner side walls of said outermost grooves, the buffer blocks opposite these traction-slits which extend to the inner side walls of said outermost grooves being formed as integral projections of the outer side walls of said grooves.

4. In a pneumatic tire casing of the character described, a tread portion comprising a plurality of laterally spaced circumferentially continuous riding ribs defining between each pair of adjoining ribs a groove of substantial depth, each of said ribs including a plurality of sequentially arranged pattern segments of equal extent measured circumferentially about the tread portion of the tire casing, each of said segments being divided into a plurality of divisions of uniform length, and the number of divisions in each of a pair of adjoining segments being different, and traction means in the form of sipes provided in each division of each pattern segment of certain of said ribs, said sipes being generally of Y-shape and being disposed with the stem portion thereof extending transvesely of the rib toward and through one side edge of the rib and a pair of diverging branches extending toward and terminating short of the opposite side edge of the rib, the sipes within one pattern segment being all of uniform length measured circumferentially about the tread portion of the casing, and the sipes in each pattern being different in length, measured circumferentially about the tread portion of the casing, from the sipes of the adjoining pattern segments.

References Cited in the file of this patent

UNITED STATES PATENTS

| | | |
|---|---|---|
| D. 71,059 | Freedlander | Sept. 14, 1926 |
| D. 72,553 | Galvin | May 3, 1927 |
| D. 169,914 | Roberts | June 23, 1953 |
| D. 170,711 | Nellen | Oct. 27, 1953 |
| 2,604,920 | Kirby | July 29, 1952 |
| 2,612,928 | Buddenhagen | Oct. 7, 1952 |
| 2,661,041 | Walsh | Dec. 1, 1953 |
| 2,690,202 | Walsh | Sept. 28, 1954 |